United States Patent
Lee et al.

(10) Patent No.: US 9,162,895 B2
(45) Date of Patent: Oct. 20, 2015

(54) METHOD AND APPARATUS FOR MANUFACTURING GRAPHENE POWDER AND GRAPHENE POWDER MANUFACTURED USING THE SAME

(71) Applicant: LG ELECTRONICS INC., Seoul (KR)

(72) Inventors: Sungguk Lee, Seoul (KR); Dongwook Lee, Seoul (KR); Byunghwa Seo, Seoul (KR); Nami Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 207 days.

(21) Appl. No.: 13/747,764

(22) Filed: Jan. 23, 2013

(65) Prior Publication Data
US 2013/0315815 A1    Nov. 28, 2013

(30) Foreign Application Priority Data
May 24, 2012   (KR) .................. 10-2012-0055569

(51) Int. Cl.
| | | |
|---|---|---|
| *C01B 31/04* | (2006.01) | |
| *C01B 31/00* | (2006.01) | |
| *B82Y 30/00* | (2011.01) | |
| *B82Y 40/00* | (2011.01) | |

(52) U.S. Cl.
CPC ............. *C01B 31/0446* (2013.01); *B82Y 30/00* (2013.01); *B82Y 40/00* (2013.01); *C01B 31/00* (2013.01); *C01B 31/0476* (2013.01); *C01B 31/0484* (2013.01)

(58) Field of Classification Search
CPC   C01B 31/0476; C01B 31/0446; C01B 31/00; C01B 31/0484; C01B 31/04; C01B 31/0407; C01B 31/0415; C01B 2204/00; C01B 2204/02; C01B 2204/04; C01B 2204/06; C01B 2204/065
USPC ........................................................ 423/448
See application file for complete search history.

(56) References Cited

U.S. PATENT DOCUMENTS

| | | | | |
|---|---|---|---|---|
| 2,379,101 | A * | 6/1945 | Post .............................. | 210/455 |
| 2011/0014111 | A1* | 1/2011 | Leugers et al. ............. | 423/415.1 |
| 2011/0174701 | A1* | 7/2011 | Gallaway et al. ............. | 209/606 |
| 2011/0245378 | A1* | 10/2011 | Russ et al. ..................... | 523/440 |
| 2012/0171108 | A1* | 7/2012 | Kim et al. ..................... | 423/448 |

FOREIGN PATENT DOCUMENTS

| | | |
|---|---|---|
| EP | 2256087 A1 | 12/2010 |
| EP | 2395043 A1 | 12/2011 |
| KR | 10-2012-0079435 A | 7/2012 |

OTHER PUBLICATIONS

O'Neill, et al., Graphene Dispersion and Exfoliation in Low Boiling Point Solvents, J. Phys. Chem. C. 2011; 115: 5422-5428.*

(Continued)

*Primary Examiner* — Daniel C McCracken
(74) *Attorney, Agent, or Firm* — Birch, Stewart, Kolasch & Birch, LLP

(57) ABSTRACT

A method for manufacturing a graphene powder capable of minimizing aggregation of graphene particles and a graphene powder manufactured using the same are disclosed. The method includes preparing a graphene solution in which graphene particles are dispersed in a solvent, aggregating the graphene particles, separating the aggregated graphene particles from the solvent, and drying the graphene particles.

14 Claims, 8 Drawing Sheets

(56) References Cited

OTHER PUBLICATIONS

Definition of "filtering," accessed online at http://www.merriam-webster.com/dictionary/filtering on Feb. 3, 2015.*

Wang et al., "Graphene nanosheets for enhanced lithium storage in lithium ion batteries," Carbon, vol. 47, Issue 8, Jul. 2009, pp. 2049-2053, XP026104609.

* cited by examiner (a)

(b)

(c)

(d)

(a)

(b)

(c)

(d)

METHOD AND APPARATUS FOR MANUFACTURING GRAPHENE POWDER AND GRAPHENE POWDER MANUFACTURED USING THE SAME

This application claims the benefit of Korean Patent Application No. 10-2012-0055569, filed on May 24, 2012, which is hereby incorporated by reference as if fully set forth herein.

BACKGROUND OF THE INVENTION

1. Field of the Invention

The present invention relates to manufacture of a graphene powder, and more particularly, to an apparatus and a method for manufacturing a graphene powder capable of minimizing aggregation of graphene particles and a graphene powder manufactured using the same.

2. Discussion of the Related Art

Well-known allotropes of pure carbon are fullerene, carbon nanotubes, graphene, and graphite. Among them, graphene has a two-dimensional planar mono-layer structure of carbon atoms.

Particularly, graphene has outstanding and stable electrical, mechanical, and chemical properties as well as excellent conductivity to transport electrons faster than silicon and to allow a larger amount of current to flow than in copper. These properties have been verified through various experiments since a method of separating graphene from graphite was reported in 2004, and much research into graphene has been conducted.

Since a large area graphene can be formed, and graphene has excellent electrical, mechanical, and chemical stability as well as high conductivity, much attention has been paid to graphene as a base material for electronic circuits.

In addition, since electrical properties of graphene sheet with a given thickness may be generally changed depending on crystal orientation, the electrical properties may be controlled by selecting the crystalline orientation of the graphene sheet and to this end, device design may be straightforward. Thus, graphene may be efficiently applied to carbon-based electrical or electronic devices.

SUMMARY OF THE INVENTION

Accordingly, the present invention is directed to a method and apparatus for manufacturing a graphene powder and grapheme powder manufactured using the same that substantially obviate one or more problems due to limitations and disadvantages of the related art.

An object of the present invention is to provide an apparatus and a method for manufacturing a graphene powder capable of minimizing aggregation of graphene particles by adjusting the aggregation of graphene particles during preparation, and a graphene powder manufactured using the same.

Another object of the present invention is to provide an apparatus and a method for manufacturing a graphene powder capable of considerably reducing process time and efficiently removing residues, and a graphene powder manufactured using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing a graphene powder includes preparing a graphene solution in which graphene particles are dispersed in a solvent, aggregating the graphene particles, separating the aggregated graphene particles from the solvent, and drying the graphene particles.

In another aspect of the present invention, a method for manufacturing a graphene powder includes preparing a graphene solution in which graphene particles are dispersed in a solvent, aggregating the graphene particles, separating the aggregated graphene particles from the solvent using a filter, loosening the aggregation of the graphene particles, and drying the graphene particles.

In another aspect of the present invention, an apparatus for manufacturing a graphene powder includes a first vessel including an inlet through which a graphene solution in which graphene particles are dispersed in a solvent is injected, an agitator, and an outlet, and a second vessel connected to the first vessel and including a filter.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Exemplary embodiments of the present invention will be described in detail. However, the present invention is not restricted to the embodiments but include variations, equivalents, and substitutions of technical configurations of the invention disclosed in the appended claims.

It will also be understood that when an element such as a layer, a region, or a substrate is referred to as being "on" another element, it can be directly on the other element, or intervening elements may also be present.

It will be understood that, although the terms first, second, etc., may be used herein to describe various elements, components, regions, layers and/or sections, these elements, components, regions, layers and/or sections should not be limited by these terms.

Figure 1:
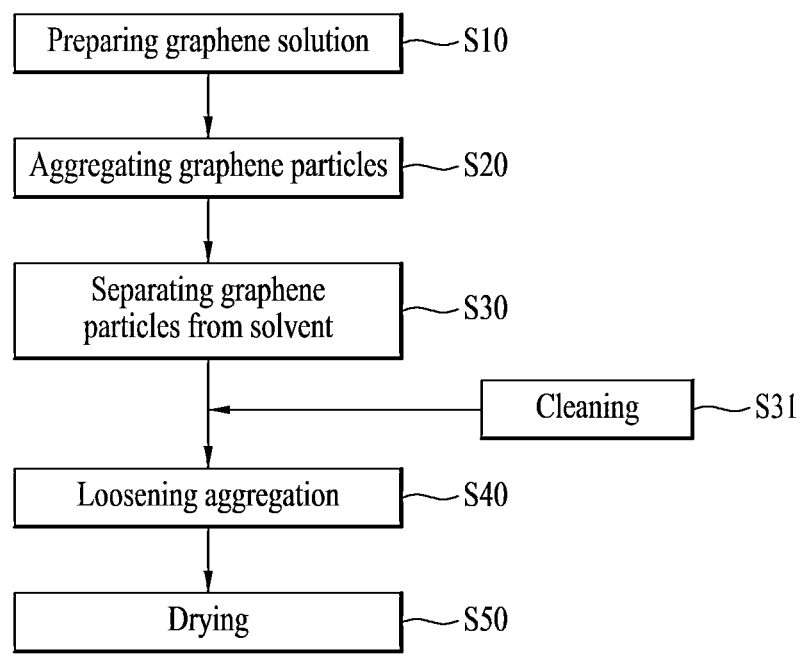
FIG. 1 is a flowchart illustrating a process of manufacturing a graphene powder.
Figure 2:
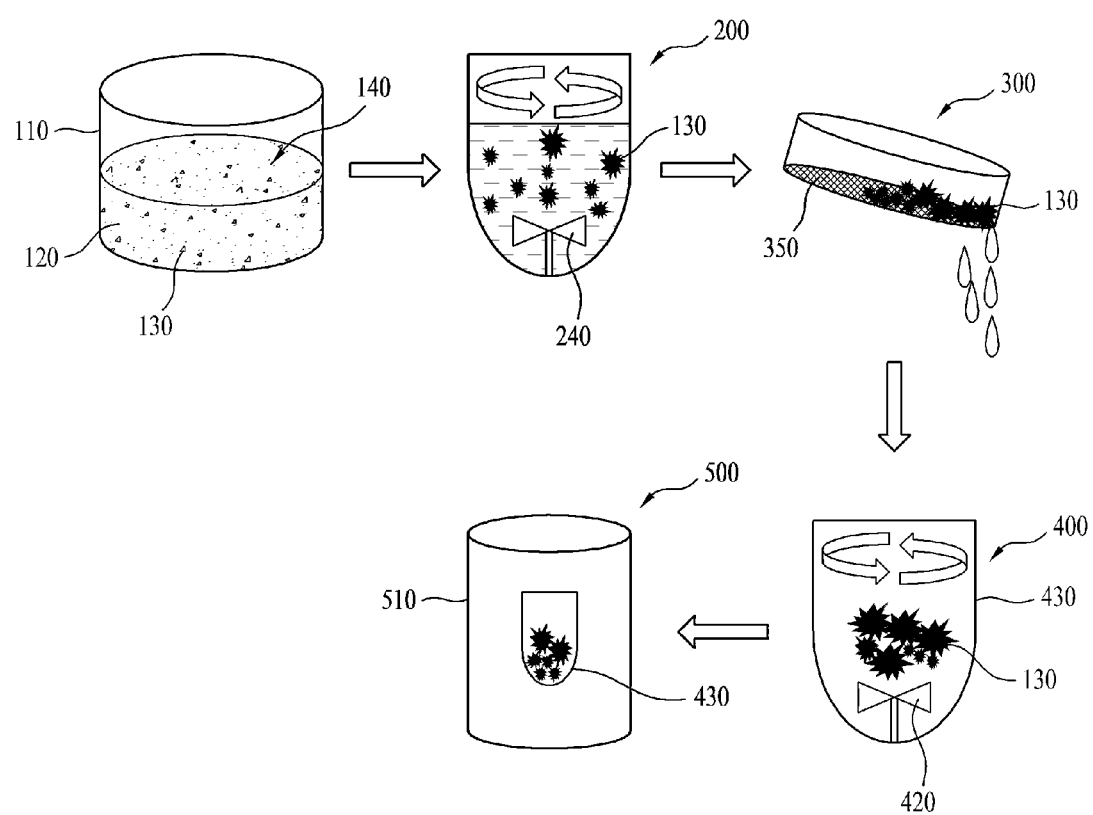
FIG. 2 is a schematic diagram illustrating a method of manufacturing a graphene powder.

As shown in FIGS. 1 and 2, first, a graphene solution 140 in which graphene particles 130 are dispersed in a solvent 120 is prepared in order to prepare a graphene powder (S10). The graphene solution 140 may be contained in a vessel 110.

As such, the graphene solution 140 may be a solution in which the graphene particles 130 are dispersed in the solvent 120 such as water.

In addition, the graphene solution 140 may be prepared by preparing graphene oxide as the graphene particles 130 and dispersing a reduced form thereof in the solvent 120. The solvent 120 may be water, but is not limited thereto.

The graphene oxide refers to an oxide obtained by oxidizing carbon with acid. The graphene oxide may be generally prepared by oxidizing graphite with strong acid such as sulfuric acid. As occasion demands, a mixture of sulfuric acid and hydrogen peroxide may be used for oxidization.

Graphite has a planar structure and is oxidized by strong acid. When graphite is chemically broken down to smaller particles, the graphene oxide is obtained.

Then, the graphene oxide may be reduced by a reduction process to prepare the graphene particles 130. The reduction process may be performed using a reducing agent. Thus, the graphene solution 140 may include residues such as a reducing agent in addition to the graphene particles 130 and the solvent 120.

Thus, the operation of preparing the graphene solution 140 may include reducing the graphene oxide using a reducing agent and dispersing the reduced graphene in a solvent.

While the graphene oxide is generally hydrophilic, the reduced graphene particles 130 have low hydrophilicity and aggregate with each other.

Then, a micro-aggregation of the graphene particles 130 is induced using a physical agitator 200 such as a motor 210 (FIG. 3) and a blade 240 (S20).

As such, when the graphene solution 140 in which the graphene particles 130 are dispersed in the solvent 120 is stirred using an agitator, the graphene particles 130 aggregate with each other.

This is because the graphene particles 130 attract each other when colliding with each other during rotation due to water-repellent properties of the graphene particles 130.

The physical agitator 200 may include a rotary device such as a mixer using a motor and a blade as described above and a homogenizer (not shown).

As another example of the physical agitator 200, an agitator that enables a solvent contained in a solvent container to rotate by rotating the solvent container itself may also be used.

According to the speed of rotation, the graphene particles 130 generally aggregate with each other within a few seconds to a few hours. The degree of aggregation may be controlled by adjusting stirring time.

In addition, the speed of rotation of the agitator may be in the range of thousands of rpm (revolutions per minute) to tens of thousands of rpm, preferably, about 1,000 rpm to about 90,000 rpm.

Then, the graphene particles 130 are separated from the solvent 120 (S30). The separation may be performed using a filter 300, and the filter 300 includes a mesh screen 350 having pores for separating the solvent 120. The filter 300 may quickly separate the solvent 120 from the graphene particles 130.

As such, the filter 300 may be a mesh screen 350 having a pore size of 1 to 1,000 μm. That is, when the graphene solution 140 is filtered with the mesh screen 350, the aggregate of the graphene particles 130 is filtered by the mesh screen 350, and the solvent 120 passes through the mesh screen 350.

In this regard, residues such as the reducing agent remaining in the solvent 120 are also separated therefrom. However, residues remaining on the aggregate may also be removed via a cleaning process (s31) of pouring pure water onto the aggregate of the graphene particles 130 remaining on the mesh screen 350 (S31). That is, the cleaning process (S31) may be added or may not be performed. The cleaning process (s31) may be conducted by cleaning the aggregate of the graphene particles 130 with water.

According to such process, residues may be efficiently reduced or removed from the graphene particles 130. Table 1 shows contents of remaining carbon (C), hydrogen (H), sulfur (S), and oxygen (O) of the resultant according to the present invention and that of a comparative product.

In other words, according to the present invention, carbon (C), element constituting the graphene particles 130, accounts for the majority of the resultant, and sulfur (S) or sulfuric acid was not detected therefrom.

As described above, hazardous components used in the preparation of graphene were not detected when the method according to the present invention was used.

TABLE 1

| Element | Present invention | Comparative product |
| --- | --- | --- |
| C | 85.12 | 92.14 |
| H | 0.58 | 0.14 |
| S | 0 | 0.79 |
| O | 5.19 | 2.51 |

As such, when the solvent 120 is separated from the graphene particles 130 using the filter 300 including the mesh screen 350, a period of time during which a graphene powder is prepared is considerably reduced.

Then, the aggregation of the graphene particles 130 is loosened by rotating the separated aggregate of the graphene particles 130 at a high speed using a blade 420 in an agitator 400 (S40).

That is, the aggregation of the graphene particles 130 is loosened by rotating the blade 420 of the agitator 400 for a few seconds to a few minutes. Here, the speed of rotation may be in the range of thousands of rpm to tens of thousands of rpm. More preferably, the speed of rotation may be in the range of about 1,000 rpm to about 90,000 rpm.

As such, the disaggregated graphene particles 130 are dried using a dryer 500 (S50). In this regard, drying using the dryer 500 may be conducted by disposing the same vessel 430 used in the agitator 400 in a drying chamber 510.

That is, the aggregation of the graphene particles 130 may be loosened by disposing the blades 420 in the vessel 430 applicable to the dryer 500.

The dryer 500 may be any dryer using thermal drying, freeze drying, vacuum drying, or the like.

The disaggregated graphene particles 130 are powdered by the drying process to prepare a graphene powder.

If required, the drying process (S50) may be conducted using the dryer 500 immediately after the separation of the aggregated graphene particles 130 from the solvent 120 (S30).

The aggregating the graphene particles 130 (S20), separating the aggregate of the graphene particles 130 from the solvent 120 (S30), and loosening the aggregation of the graphene particles 130 (S40) will be described in more detail.

Figure 3:
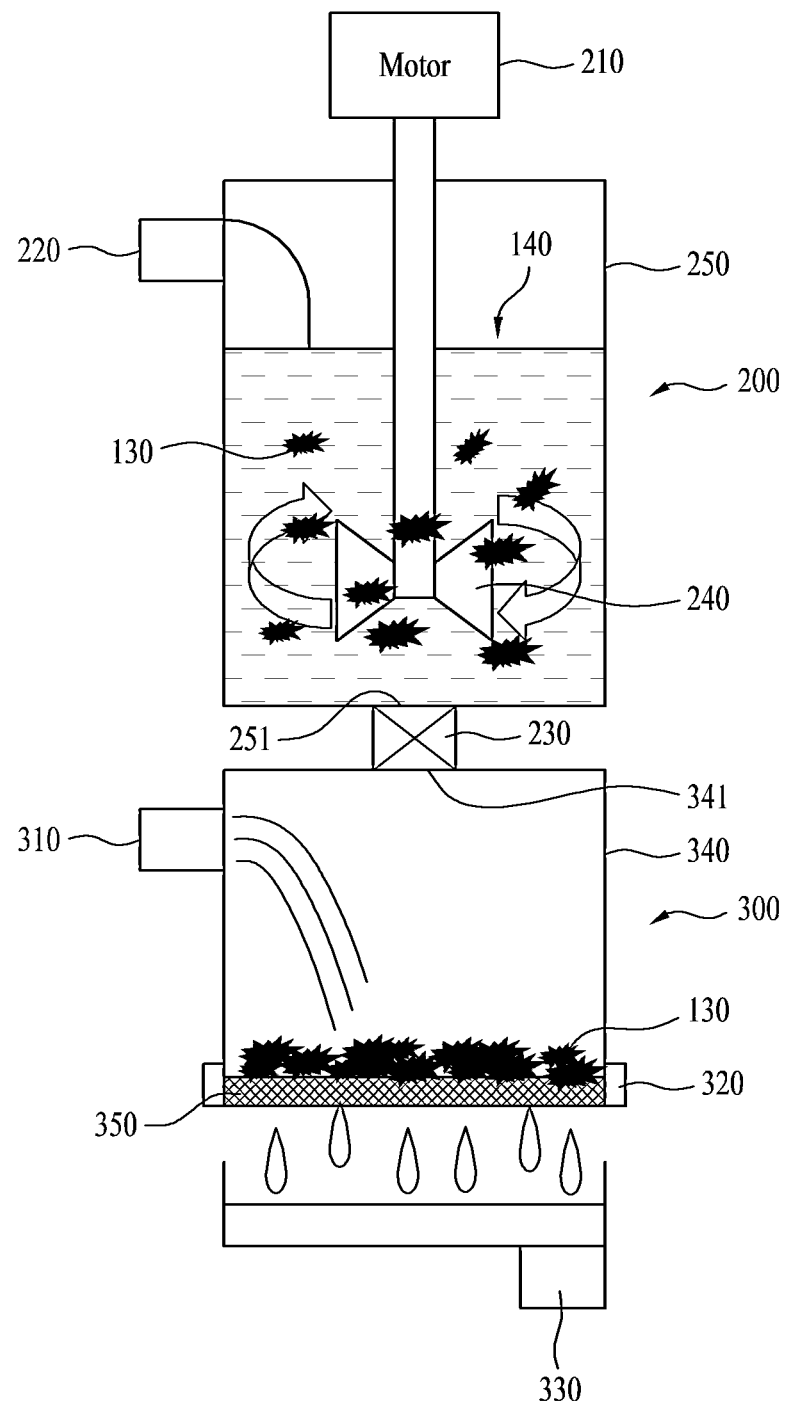
FIG. 3 is a schematic diagram illustrating aggregating graphene particles and separating the graphene particles from a solvent.

As shown in FIG. 3, aggregating the graphene particles 130 (S20) and separating the aggregate of the graphene particles 130 from the solvent 120 (S30) may be consecutively conducted.

The aggregation of the graphene particles 130 may be conducted using an agitator 200 including a vessel 250 containing the graphene solution 140 and the blade 240 rotating by rotating power from the motor 210 and disposed in the vessel 250.

In this regard, an inlet 220 may be disposed at one portion of the vessel 250 through which the graphene solution 140 or a dispersant is injected.

The filter 400 is disposed under the agitator 200. The filter 300 includes a vessel 340 that receives the graphene solution 140 and a mesh screen 350 disposed at a lower portion of the vessel 340. Thus, the solvent 120 may be separated from the aggregate of the graphene particles 130 through the mesh screen 350.

In this regard, the vessel 250 of the agitator 200 and the vessel 340 of the filter 300 are connected to each other via a shut off valve 230. That is, an outlet 251 is disposed at a lower portion of the vessel 250 of the agitator 200, and an inlet 341 that may be connected to the outlet 251 is disposed at an upper portion of the vessel 340 of the filter 300. The outlet 251 and the inlet 341 may be connected to each other via the shut off valve 230.

Thus, the aggregating the graphene particles 130 (S20) and separating the aggregate of the graphene particles 130 from the solvent 120 (S30) may be consecutively performed.

The vessel 340 of the filter 300 may include an inlet 310 for injecting a cleaning solution for the graphene particles 130 and an outlet 330 for discharging a solvent or a solution.

In addition, the mesh screen 350 may be fixed to the vessel 340 or separated therefrom using a locking device 320.

Figure 4:
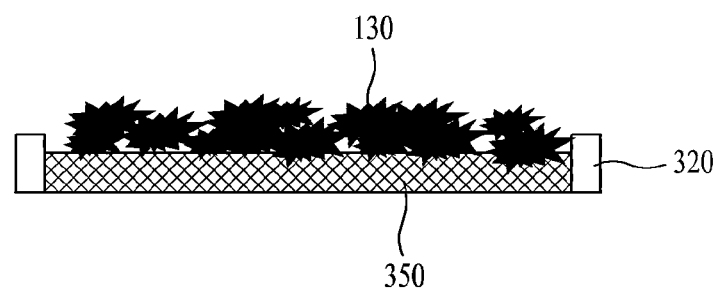
FIG. 4 is a schematic diagram illustrating separating graphene particles from a solvent.

FIG. 4 shows the mesh screen 350 separated by unfastening the locking device 320. As such, by separating the mesh screen 350, the graphene particles 130 may be transported into the agitator 400 or the dryer 500.

Figure 5:
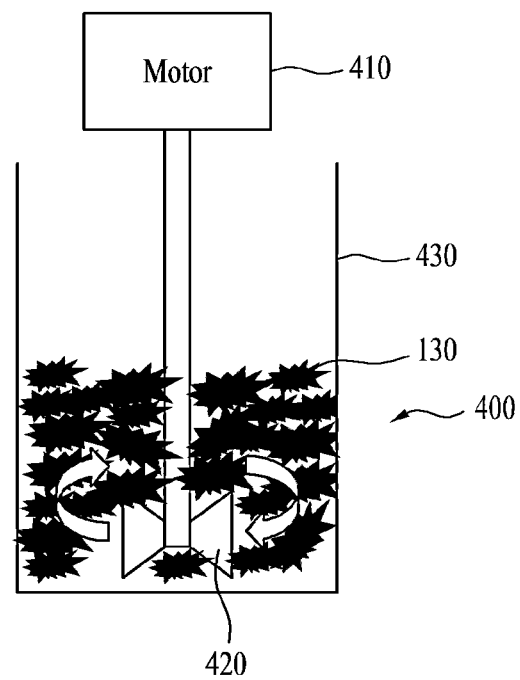
FIG. 5 is a schematic diagram illustrating loosening aggregation of graphene particles.

FIG. 5 shows a process of loosening the aggregation of the graphene particles 130 using the agitator 400.

As such, the aggregation of the graphene particles 130 may be loosened in a vessel 430 by inserting an agitator 400 including a motor 410 and a blade 420 thereto.

The disaggregated graphene particles 130 are dried in the dryer 500 to prepare a graphene powder.

Figure 6:
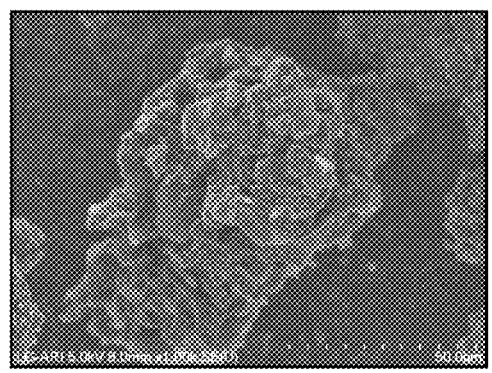
FIG. 6 shows 1,000-fold magnification photographs of graphene powders prepared by conventional methods.
Figure 6:
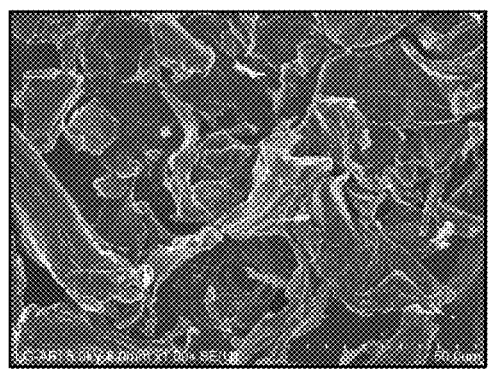
Figure 6:
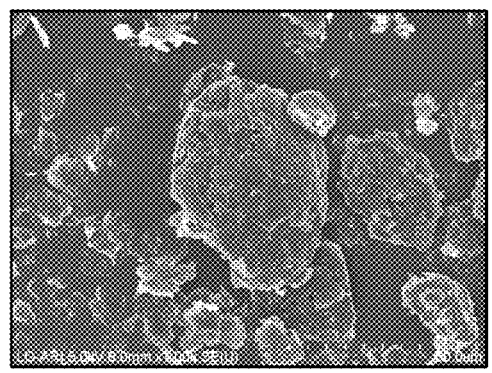
Figure 6:
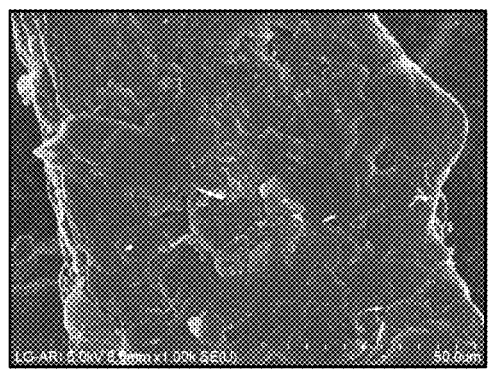
Figure 7:
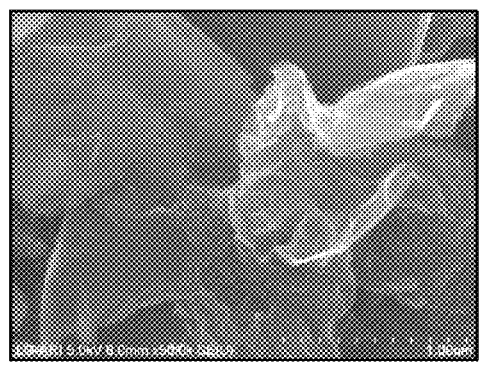
FIG. 7 shows 50,000-fold magnification photographs of graphene powders prepared by conventional methods.
Figure 7:
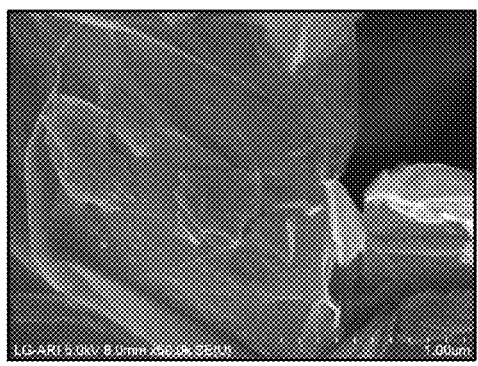
Figure 7:
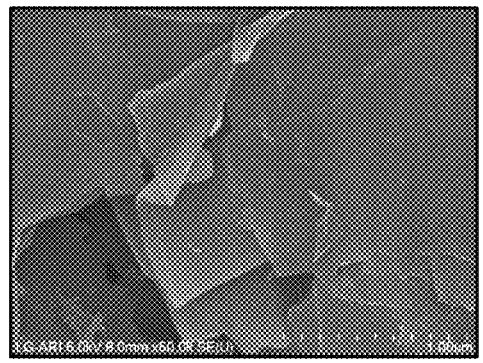
Figure 7:
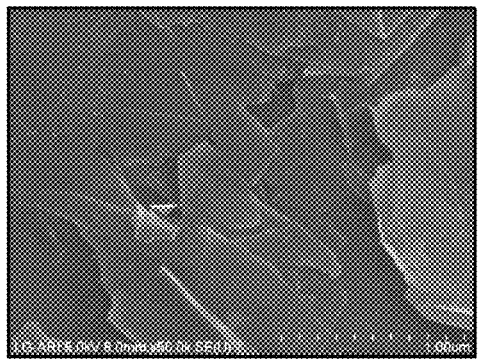

FIG. 6 shows 1,000-fold magnification photographs of four graphene powder products (a, b, c, and d) prepared by conventional methods. FIG. 7 shows 50,000-fold magnification photographs of the four products (a, b, c, and d).

As shown in the photographs, it can be seen that the graphene powders prepared using conventional methods had a high degree of aggregation of graphene particles.

Figure 8:
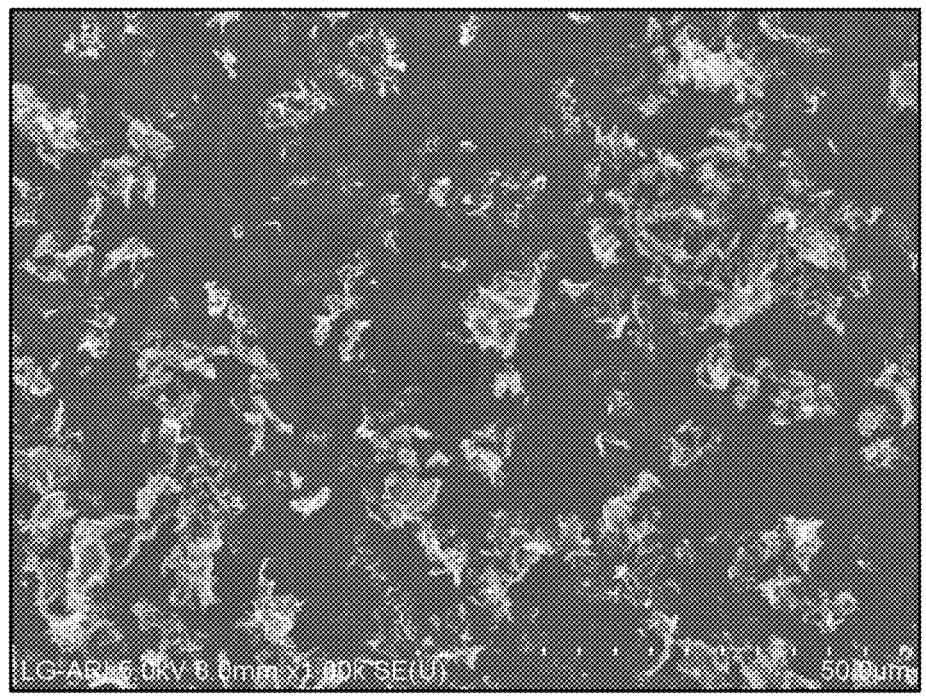
FIG. 8 shows 1,000-fold magnification photographs of a graphene powder prepared according to the present invention.

Meanwhile, FIG. 8 shows a 1,000-fold magnification photograph of a graphene powder prepared according to the present invention. Referring to the photograph, the particles are uniformly dispersed compared with the four products shown in FIG. 6.

Figure 9:
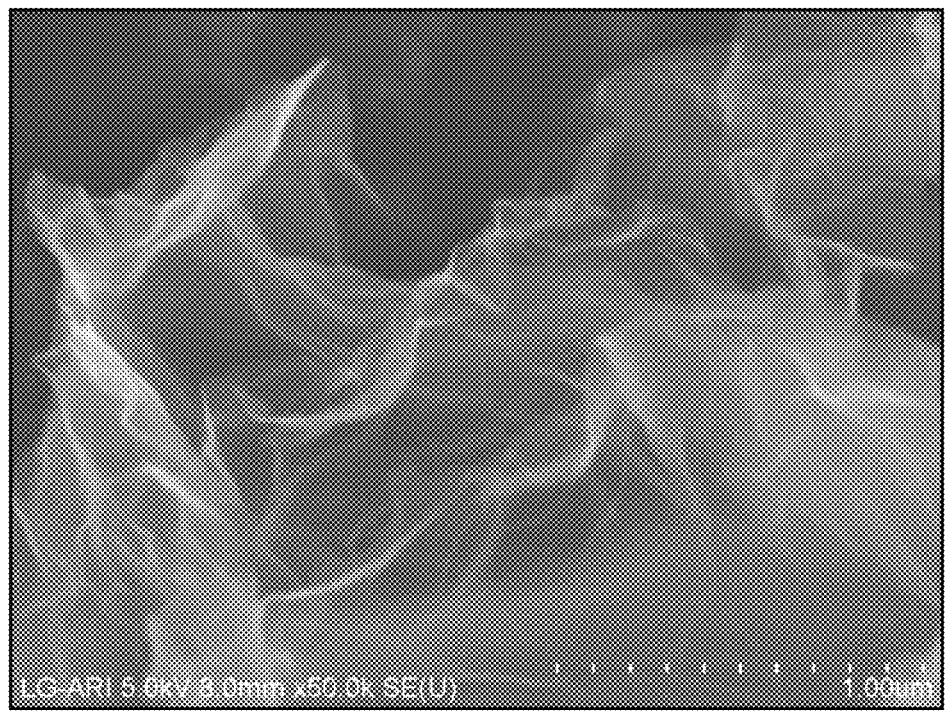
FIG. 9 shows 50,000-fold magnification photographs of a graphene powder prepared according to the present invention.

FIG. 9 shows a 50,000-fold magnification photograph of a graphene powder prepared according to the present invention. Similarly, the particles are uniformly dispersed compared with the four products shown in FIG. 7.

If the graphene powder is prepared according to the method described above, aggregation of the graphene particles may be minimized, and thus the graphene powder has uniformly dispersed particles.

In addition, since the graphene particles are separated from the solvent using a filter including a mesh screen, a processing time may be considerably reduced.

Furthermore, a cleaning process may further be performed, and thus residual acid, oxidant, and reductant remaining in the preparation of the graphene powder may be reduced or removed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a graphene powder, the method comprising:
preparing a graphene solution in which graphene particles are dispersed in a solvent;
aggregating the graphene particles by inducing aggregation with a first agitator;
separating the aggregated graphene particles from the solvent with a filter including a mesh screen;
disaggregating the grapheme particles with a second agitator such that the induced aggregation of the graphene particles is loosened after the separating of the aggregated graphene particles from the solvent; and
drying the graphene particles.

2. The method according to claim 1, wherein the first agitator comprising a first vessel comprising an inlet through which the graphene solution in which the graphene particles are dispersed in the solvent is injected and an outlet.

3. The method according to claim 1, wherein a pore size of the mesh screen is in a range of 1 to 1,000 μm.

4. The method according to claim 3, wherein the filter comprises a second vessel to which the mesh screen is detachably connected.

5. The method according to claim 1, wherein the drying of the graphene particles is performed using at least one method selected from the group consisting of freeze drying, thermal drying, and vacuum drying.

6. The method according to claim 1, further comprising cleaning the aggregated graphene particles after the separating of the aggregated graphene particles from the solvent.

7. The method according to claim 1, wherein the preparing of the graphene solution comprises:
reducing a graphene oxide using a reducing agent; and
dispersing the reduced graphene in a solvent.

8. The method according to claim 1, wherein the aggregating of the graphene particles and the separating of the aggregated graphene particles from the solvent are consecutively performed.

9. The method according to claim 1, further comprising controlling a degree of aggregation of the graphene particles by adjusting a stirring time of the first agitator.

10. The method according to claim 1, further comprising a cleaning process of the graphene particles.

11. The method according to claim 10, wherein the cleaning process is performed when the graphene particles are on the mesh screen.

12. The method according to claim 1, wherein aggregating the graphene particles and separating the aggregate of the graphene particles from the solvent are consecutively conducted.

13. The method according to claim 1, wherein the first agitator rotates, and
   wherein a speed of rotation of the first agitator is in a range of about 1,000 rpm to about 90,000 rpm.

14. The method according to claim 1, wherein the second agitator has a blade.

* * * * *